(12) United States Patent
Beall et al.

(10) Patent No.: US 7,341,970 B2
(45) Date of Patent: Mar. 11, 2008

(54) LOW THERMAL EXPANSION ARTICLES

(75) Inventors: Douglas Munroe Beall, Painted Post, NY (US); Matthew John Dejneka, Corning, NY (US); Christy Lynn Powell, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 49 days.

(21) Appl. No.: 11/092,001

(22) Filed: Mar. 28, 2005

(65) Prior Publication Data

US 2005/0217228 A1    Oct. 6, 2005

Related U.S. Application Data

(60) Provisional application No. 60/558,165, filed on Mar. 31, 2004.

(51) Int. Cl.
*C04B 35/495* (2006.01)
*C04B 35/46* (2006.01)
*C04B 35/48* (2006.01)
*B01D 39/06* (2006.01)

(52) U.S. Cl. ............ 501/134; 501/103; 501/104; 501/135; 55/523; 264/630; 264/638

(58) Field of Classification Search ......... 501/134, 501/135, 103, 104; 55/523; 264/630, 638
See application file for complete search history.

(56) References Cited

U.S. PATENT DOCUMENTS

| 2,311,918 | A | * | 2/1943 | Wainer et al. ............ 423/598 |
| 3,948,813 | A | * | 4/1976 | Holcombe et al. ....... 252/518.1 |
| 4,542,083 | A | * | 9/1985 | Cava et al. ............. 429/231.5 |
| 5,098,455 | A | | 3/1992 | Doty et al. |
| 5,145,833 | A | | 9/1992 | Prunier, Jr. et al. |
| 5,194,154 | A | | 3/1993 | Moyer et al. |
| 5,198,007 | A | | 3/1993 | Moyer et al. |
| 6,306,335 | B1 | | 10/2001 | Wallin et al. |
| 6,322,605 | B1 | * | 11/2001 | He et al. ................. 55/523 |
| 6,596,665 | B2 | | 7/2003 | Wallin et al. |

FOREIGN PATENT DOCUMENTS

| WO | 86/01196 | 2/1986 |
| WO | 92/11219 | 7/1992 |
| WO | 02/085482 | 10/2002 |
| WO | 02/085814 | 10/2002 |
| WO | 03/082773 | 10/2003 |

OTHER PUBLICATIONS

Choosuwan et al., "Negative thermal expansion behavior in single crystal and ceramic of Nb2O5-based compositions", Journal of Applied Physics, vol. 91, No. 8, Apr. 15, 2002, pp. 5051-5054.

(Continued)

*Primary Examiner*—Karl E Group
(74) *Attorney, Agent, or Firm*—Tina N. Thompson

(57) ABSTRACT

Compositions, and articles having low thermal expansion suitable for high temperature applications, such as automotive exhaust treatment and method of manufacturing such articles are disclosed.

18 Claims, 6 Drawing Sheets

OTHER PUBLICATIONS

Holcomb, Jr., Cressie, "Thermal Expansion Coefficients for Low Expansion Oxides", American Ceramic Society Bulletin, Jan. vol. 59, No. 12 (1980), p. 1219.

S. R. Skaggs, "Zero and Low Coefficient of Thermal Expansion Polycrystalline Oxides", LA-6918-MS Informal Report, Los Alamos Scientific Lab., NM, Sep. 1997, pp. 1-11.

C. E. Holcombe et al., "Survey Study of Low-Expanding High-Melting, Mixed Oxides", Y-1913, Oak Ridge Y-12 Plant, Oak Ridge, TN, Feb. 14, 1974, pp. 1-22.

Li et al., "Properties and Performance of Diesel Particulate Filters of an Advanced Ceramic Material", 2004-01-0955, 2004 SAE International.

* cited by examiner

LOW THERMAL EXPANSION ARTICLES

This application claims the benefit of U.S. Provisional Application No. 60/558,165, filed Mar. 31, 2004, entitled "Low Thermal Expansion Articles", by Dejneka et al.

FIELD OF THE INVENTION

This invention relates to low thermal expansion compositions, articles made from these compositions and methods of making such articles.

BACKGROUND OF THE INVENTION

Thermally shock resistant articles having low thermal expansion find use in applications in which it is critical to maintain product dimensions, especially for example during high temperature cycling as in automotive exhaust treatment applications. In particular, low thermal expansion articles have been used as filters for fluids, such as diesel particulate filters and as substrates for catalytic converters. Typically such articles comprise a honeycomb body and are subjected to harsh environments, which require high thermal and mechanical shock resistance as well as low thermal expansion. Maintaining these properties for extended periods of time in their intended environments eliminates many potentially useful refractory materials.

Cordierite honeycomb substrates are employed in a number of high temperature applications including catalytic converters, $NO_x$ adsorbers, electrically heated catalysts, molten metal filters, regenerator cores, chemical process substrates, catalysts for hydrodesulfurization, hydrocracking, or hydrotreating, and diesel particular filters, in part due to the high thermal shock resistance of cordierite. The thermal shock resistance is inversely proportional to the coefficient of thermal expansion. That is, cordierite honeycombs have a good thermal shock resistance and can survive the wide temperature fluctuations that are encountered during application. However, under certain circumstance cordierite substrates are less than satisfactory. As diesel particulate filters (DPFs) which ideally combine low CTE (for thermal shock resistance), low pressure drop (for engine efficiency), high filtration efficiency (for removal of most particles from the exhaust stream), high strength (to survive handling, canning, and vibration in use), and low cost, the combination of high thermal shock resistance and very low pressure drop has proven elusive with cordierite DPFs. In addition, cordierite is not compatible with potassium based $NO_x$ adsorbers, which chemically react with cordierite, destroying both the adsorber as well as the cordierite support.

Accordingly, there is a need to provide alternative low thermal expansion refractory materials that are able to withstand thermal shock and the steep thermal gradients encountered in high temperature applications.

SUMMARY OF THE INVENTION

The invention provides a ceramic article exhibiting a thermal expansion of less than $20 \times 10^{-7}/°C$. over a temperature ranging from 25° C. to 800° C., and having a composition comprising $x(A)+y(Z_2O_5)$, where x and y are mole fractions of each component such that $x+y=1$, such that $0 \leq x \leq 0.80$ and $0.20 \leq y \leq 1.00$, wherein A is selected from the group of oxides consisting of RO, R'$O_2$, R"$_2O_3$, R"'$O_3$, R""$_2O_5$, and mixtures thereof, and Z is selected from the group consisting of niobium (Nb), tantalum (Ta), vanadium (V), phosphorous (P) and mixtures thereof. Preferably $0.10 \leq x \leq 0.50$, more preferably $0.20 \leq x \leq 0.30$; and, preferably $0.50 \leq y \leq 0.90$, more preferably $0.70 \leq y \leq 0.80$.

Depending on the oxide(s) comprising A, the following conditions are met: (a) for RO, R is selected from the group consisting of magnesium (Mg), calcium (Ca), strontium (Sr), barium (Ba), nickel (Ni), zinc (Zn), and manganese (Mn), and $0 \leq x \leq 0.40$; (b) for R'$O_2$, R' is selected from the group consisting of titanium (Ti) and zirconium (Zr), and $0.15 \leq x \leq 0.80$ when R' is Ti, and $0.05 \leq x \leq 0.76$ when R' is Zr; (c) for R"$_2O_3$, R" is selected from the group consisting of boron (B), aluminum (Al), gallium (Ga), lanthanum (La) and iron (Fe) and $0 \leq x \leq 0.40$; (d) for R"'$O_3$, R"' is selected from the group consisting of molybdenum (Mo) and tungsten (W) and $0 \leq x \leq 0.50$; and (e) for R""$_2O_5$, R"" is phosphorous (P) and $0 < x \leq 0.25$. Further for component Z the following conditions are met: (a) $0 \leq y \leq 0.95$ for $Nb_2O_5$; (b) $0 \leq y \leq 0.85$ for $Ta_2O_5$; (c) $0 \leq y \leq 0.50$ for $V_2O_5$; and (d) $0 \leq y \leq 0.25$ for $P_2O_5$.

In preferred embodiments (a) for RO, when R is selected from the group consisting of Mg, Ca, Sr, and Ba then $0 \leq x \leq 0.30$; when R is Ni then $0 \leq x \leq 0.15$; and, when R is Mn then $0 \leq x \leq 0.24$; (b) for R'$O_2$, when R' is Ti then $0.15 \leq x \leq 0.30$, more preferably $0.20 \leq x \leq 0.30$; when R' is Zr then $0.10 \leq x \leq 0.30$, more preferably $0.10 \leq x \leq 0.20$; (c) for R"$_2O_3$, when R" is selected from the group consisting of B, Al, Ga, and Fe then $0 \leq x \leq 0.20$, more preferably when R" is selected from the group consisting of B, Al, and Ga then $0 \leq x \leq 0.05$; (d) for R"'$O_3$, when R"' is Mo then $0 \leq x \leq 0.01$; when R"' is W then $0 \leq x \leq 0.05$; (e) when R"" is phosphorous (P), then $0 \leq x \leq 0.1$; (f) $0.45 \leq y \leq 0.90$ for $Nb_2O_5$, more preferably $0.65 \leq y \leq 0.80$; (g) $0 \leq y \leq 0.10$ for $Ta_2O_5$, more preferably $0 \leq y \leq 0.01$ for $Ta_2O_5$; (h) $0 \leq y \leq 0.10$ for $V_2O_5$; and (i) $0 \leq y \leq 0.10$ for $P_2O_5$.

In another embodiment the inventive composition may further include additives selected from the group consisting of (a) alkalis, such as $Li_2O$, $Na_2O$, $K_2O$, $Rb_2O$, and $Cs_2O$ in an amount ranging from 0 to 0.10 mole fraction, preferably 0 to 0.02, and more preferably 0 to 0.01; and, (b) rare earth oxides, such as $Y_2O_3$, and $La_2O_3$ in an amount ranging from 0 to 0.20 mole fraction, preferably 0 to 0.10, and more preferably 0 to 0.01.

The inventive ceramic article is particularly suitable for use in diesel exhaust filtration, as it provides such an application with a low pressure drop and low back pressure against the engine, along with durability during thermal cycling. The diesel particulate filter is comprised of a plugged, wall-flow honeycomb body. In one embodiment the honeycomb body is composed of a ceramic having a composition provided by $x(A)+y(Nb_2O_5)$, wherein A is selected from the group consisting of $TiO_2$ and $ZrO_2$, with $0.25 \leq y \leq 0.50$, and $0.50 \leq y \leq 0.75$. Preferably, the honeycomb body is composed of a ceramic having a composition provided by $0.25(TiO_2)+0.75(Nb_2O_5)$, wherein the ceramic has a predominant phase of $Ti_2Nb_{10}O_{29}$.

In another embodiment the DPF comprises a honeycomb body composed of titanium niobate ceramic material having a predominant phase of $Ti_2Nb_{10}O_{29}$, and exhibiting the following properties: a CTE (25-800° C.) of −5 to +5×$10^{-7}/°$C.; a porosity of 50% to 75% by volume; a median pore size of 10 to 25 micrometers; a modulus of rupture in the range of 300-600 psi, as measured by the four-point method on a cellular bar cut parallel to the direction of the channels from the honeycomb body having a cell density of 200 cells per square inch (cpsi) and 0.015 inch thick wall; and, a pressure drop of 4 to 5.5 kPa or less at an artificial carbon soot loading of up to 5 g/L at a flow rate of 26 scfm for a cell density of 200 cpsi, and a cell wall thickness of 0.015 inch in a 2" diameter×6" long sample.

The invention also relates to a method of manufacturing a ceramic article exhibiting a low thermal expansion of less than $20 \times 10^{-7}$/° C. over a temperature ranging from 25° C. to 800° C., and being suitable for high temperature applications, which includes the steps of (a) formulating a batch of raw materials selected from the group consisting of oxides, carbonates, nitrates, fluorides, phosphoric acid and boric acid; (b) mixing the raw material batch with processing aids selected from the group consisting of plasticizers, lubricants, and binders to form a homogenous and plasticized mixture; (c) shaping the homogenous and plasticized mixture by extrusion to form a green body, such as a honeycomb structure; and (d) heating to a top temperature of between 1200° C. to 1650° C. for a period of 1-24 hours, preferably 1350° C. to 1425° C. for a period of 1-24 hours.

The invention also relates to a method of manufacturing a ceramic article exhibiting a low thermal expansion of less than $30 \times 10^{-7}$/° C. over a temperature ranging from 25° C. to 800° C., and being suitable for high temperature applications which includes the steps of (a) formulating a batch of raw materials including phosphoric acid and one or more selected from the group consisting of oxides, carbonates, nitrates, fluorides and boric acid, (b) mixing the raw material batch with processing aids selected from the group consisting of plasticizers, lubricants, and binders to form a homogenous and plasticized mixture, (c) shaping the homogenous and plasticized mixture by extrusion to form a green body, and (d) heating the green body to a top temperature of 300° C. to 1450° C., preferably 300° C. to 600° C., for a period of 1-24 hours.

BRIEF DESCRIPTION OF THE DRAWINGS

A complete understanding of the present invention may be obtained by reference to the accompanying drawings, when considered in conjunction with the subsequent detailed description, in which.

DETAILED DESCRIPTION OF THE INVENTION

The various embodiments of the present invention provide materials, methods and articles having low coefficients of thermal expansion. Specifically, the inventive materials have a composition represented by the general formula $x(A)+y(Z_2O_5)$, where x and y are mole fractions of each component such that x+y=1. In particular, $0 \leq x \leq 0.80$, preferably $0.10 \leq x \leq 0.50$, more preferably $0.20 \leq x \leq 0.30$; and, $0.20 \leq y \leq 1.00$, preferably $0.50 \leq y \leq 0.90$, more preferably $0.70 \leq y \leq 0.80$.

Component A is selected from the group of oxides consisting of RO, $R'O_2$, $R''_2O_3$, $R'''O_3$, $R''''_2O_5$ and mixtures thereof. For oxides RO, R is selected from the group consisting of magnesium (Mg), calcium (Ca), strontium (Sr), barium (Ba), nickel (Ni), zinc (Zn), and manganese (Mn). For oxides $R'O_2$, R' is selected from the group consisting of titanium (Ti) and zirconium (Zr). For oxides $R''_2O_3$, R'' is selected from the group consisting of boron (B), aluminum (Al), gallium (Ga), lanthanum (La) and iron (Fe). For oxides $R'''O_3$, R''' is selected from the group consisting of molybdenum (Mo) and tungsten (W). For oxides $R''''_2O_5$, R'''' is phosphorous (P).

Component Z is selected from the group consisting of niobium (Nb), tantalum (Ta), vanadium (V), phosphorous (P) and mixtures thereof.

For RO or $R''_2O_3$ oxides, x ranges from 0 to 0.40, preferably 0 to 0.30 for MgO, CaO, SrO, BaO, 0 to 0.15 for NiO, 0 to 0.24 for MnO, 0 to 0.20 for $B_2O_3$, $Al_2O_3$, $Ga_2O_3$, $Fe_2O_3$, and more preferably 0 to 0.05 for $B_2O_3$, $Al_2O_3$, $Ga_2O_3$. When A is $TiO_2$, x ranges from 0.15 to 0.80, preferably 0.15 to 0.30, and more preferably 0.20 to 0.30. For $ZrO_2$, x ranges from 0.05 to 0.76, preferably 0.10 to 0.30, and more preferably 0.10 to 0.20. When component A comprises $R'''O_3$ oxides, x ranges from 0 to 0.50, preferably 0 to 0.30 and more preferably 0 to 0.01 for $MoO_3$, and 0 to 0.05 for $WO_3$. When component A comprises $P_2O_5$, x ranges from 0 to 0.25.

For $Nb_2O_5$, y ranges from 0.20 to 0.95, preferably 0.45 to 0.90, and more preferably 0.65 to 0.80. For $Ta_2O_5$, y ranges 0 to 0.80, preferably 0 to 0.10, and more preferably 0 to 0.01. For $V_2O_5$, y ranges from 0 to 0.50, and preferably from 0 to 0.10. For $P_2O_5$, y ranges between 0 and 0.25, and preferably from 0 to 0.10.

The composition may further include additives such as alkalis and rare earth oxides. Suitable alkalis include $Li_2O$, $Na_2O$, $K_2O$, $Rb_2O$, and $Cs_2O$ in an amount ranging from 0 to 0.10 mole fraction, preferably 0 to 0.02, and more preferably 0 to 0.01. Suitable rare earth oxides include $Y_2O_3$, and $La_2O_3$ in an amount of 0 to 0.20 mole fraction, preferably 0 to 0.10, and more preferably 0 to 0.01.

Figure 1:
FIG. 1 is a photograph showing the microstructure of a ceramic material according to the present invention batched at 25 mole percent $TiO_2$ and 75 mole percent $Nb_2O_5$ and having a predominant phase of $Ti_2Nb_{10}O_{29}$.
Figure 2:
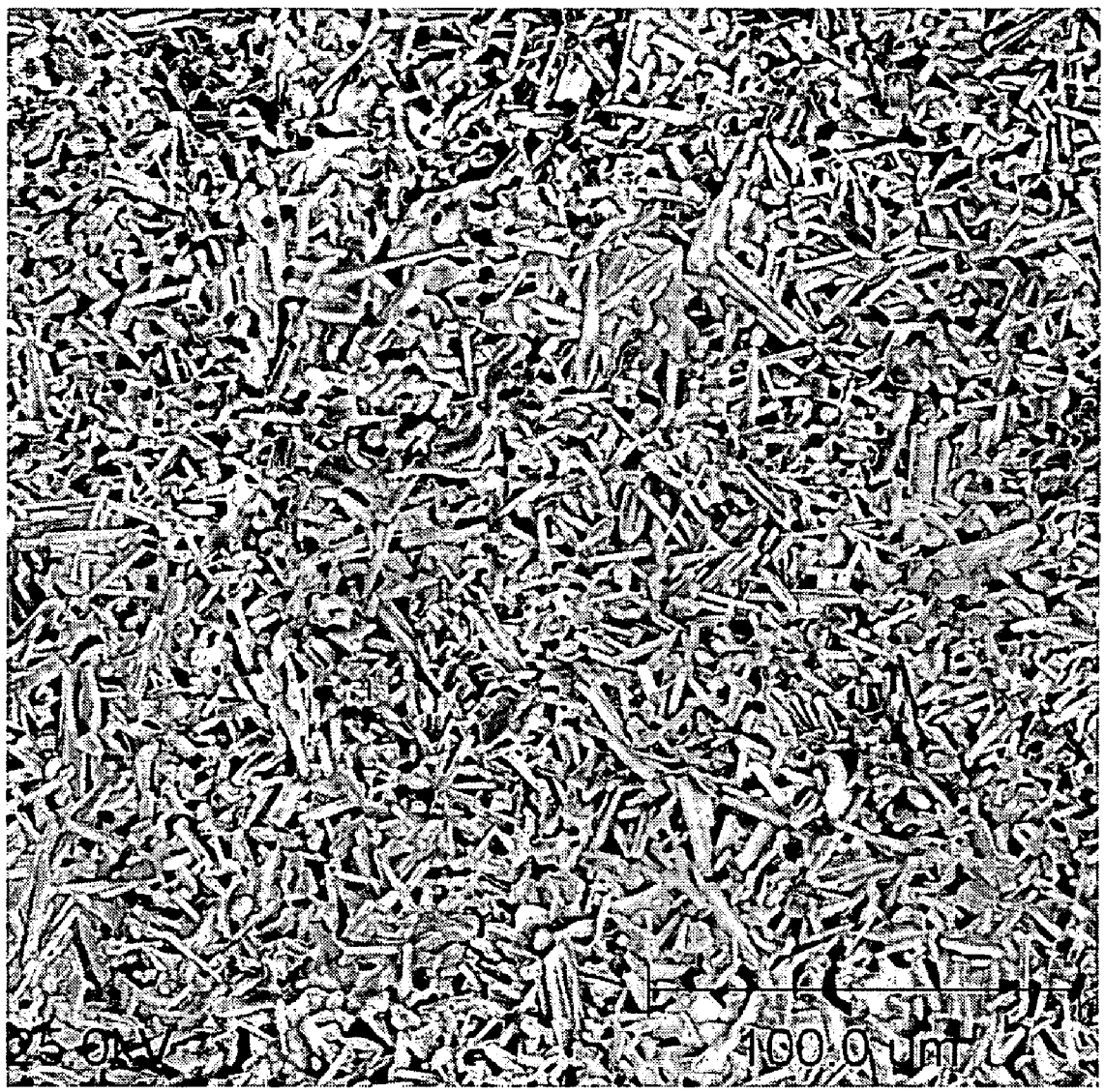
FIG. 2 is a photograph showing the microstructure of a ceramic material according to the present invention batched at 50 mole percent $TiO_2$ and 50 mole percent $Nb_2O_5$ and having a predominant phase of $TiNb_2O_7$.

The inventive ceramic materials exhibit a needle-like morphology as shown in FIGS. 1-4. FIGS. 1 and 2 are photographs of the microstructure of a ceramic material in the $TiO_2$—$Nb_2O_5$ system. The ceramic material shown in FIG. 1 is batched at 25 mole percent $TiO_2$ and 75 mole percent $Nb_2O_5$ and has a predominant phase of $Ti_2Nb_{10}O_{29}$. The ceramic material shown in FIG. 2 is batched at 50 mole percent $TiO_2$ and 50 mole percent $Nb_2O_5$ and has a predominant phase of $TiNb_2O_7$.

Figure 3:
FIG. 3 is a photograph showing the microstructure of a ceramic material according to the present invention batched at 25 mole percent $ZrO_2$ and 75 mole percent $Nb_2O_5$ and having a predominant phase of $ZrNb_{14}O_{37}$.
Figure 4:
FIG. 4 is a photograph showing the microstructure of a ceramic material according to the present invention batched at 50 mole percent $ZrO_2$ and 50 mole percent $Nb_2O_5$ and having a predominant phase of $Nb_2Zr_6O_{17}$.

The ceramic material shown in FIGS. 3 and 4 are photographs of the microstructure of a ceramic material in the $ZrO_2$—$Nb_2O_5$ system. The ceramic material shown in FIG. 3 is batched at 25 mole percent $ZrO_2$ and 75 mole percent $Nb_2O_5$ and has a predominant phase of $ZrNb_{14}O_{37}$. The ceramic material shown in FIG. 4 is batched at 50 mole percent $ZrO_2$ and 50 mole percent $Nb_2O_5$ and has a predominant phase of $Nb_2Zr_6O_{17}$. Although not intended to be bound by this theory, it is believed that the needle-like morphology is a coarse microstructure that allows for microcracking and therefore low and negative thermal expansion of the resulting ceramic body made up of anisotropic grains.

Figure 5:
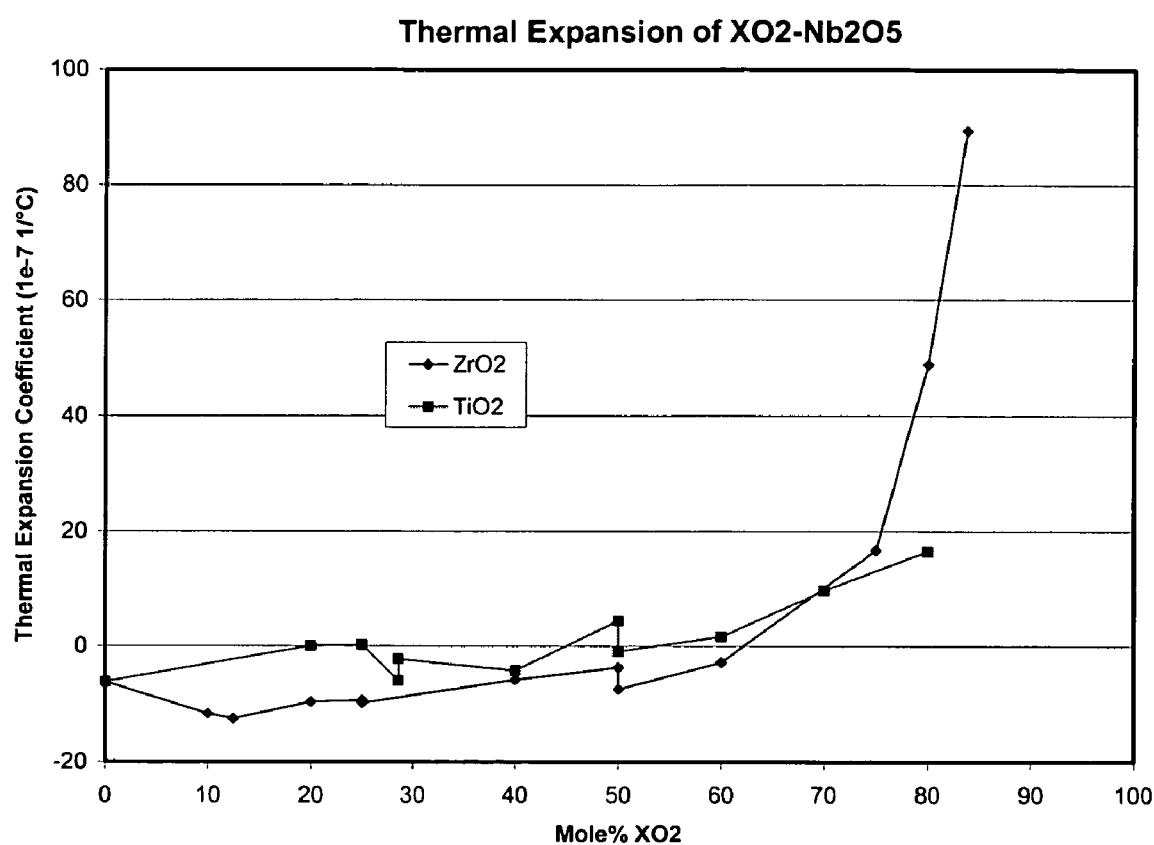
FIG. 5 is a graphical representation of thermal expansion as a function of mole percent $R'O_2$ for the $TiO_2$—$Nb_2O_5$ and $ZrO_2$—$Nb_2O_5$ systems; and, FIG. 6 is a graphical representation of pressure drop value between the inlet end and outlet end (i.e., pressure drop difference) in kPa as a function of soot loading (g/L) at a gas flow rate of 26.25 cfm for a diesel particulate filter comprising $Ti_2Nb_{10}O_{29}$ ceramic material.

Accordingly, the inventive ceramic materials exhibit a CTE ranging between $-15$ to $20 \times 10^{-7}$/° C., and preferably $-10$ to $15 \times 10^{-7}$/° C., and more preferably $-5$ to $5 \times 10^{-7}$/° C. Referring now to FIG. 5 therein shown is a graphical representation of thermal expansion as a function of mole % R'$O_2$ for the $TiO_2$—$Nb_2O_5$ and $ZrO_2$—$Nb_2O_5$ systems. The CTE increases with an increase in the mole percent for both $TiO_2$ and $ZrO_2$, and becomes unacceptable high after about 80 mole percent R'$O_2$.

In addition to low CTE, the inventive materials also exhibit high strength, making them suitable for automotive exhaust treatment applications. In one embodiment a diesel particle filter comprises a plugged, wall-flow filter body composed of a ceramic material in the $TiO_2$—$Nb_2O_5$ system according to the present invention. Preferably, the $TiO_2$—$Nb_2O_5$ material has a predominant phase of $Ti_2Nb_{10}O_{29}$.

The honeycomb filter body has an inlet end and an outlet end, along with a multiplicity of cells extending from the inlet end to the outlet end, the cells having porous walls, wherein part of the total number of cells at the inlet end are plugged along a portion of their lengths, and the remaining part of cells that are open at the inlet end are plugged at the outlet end along a portion of their lengths, so that an engine exhaust stream passing through the cells of the honeycomb from the inlet end to the outlet end flows into the open cells, through the cell walls, and out of the structure through the open cells at the outlet end. Suitable cellular densities for diesel particulate filters range from 70 cells/in$^2$ (10.9 cells/cm$^2$) to 800 cells/in$^2$ (24 cells/cm$^2$).

In a preferred embodiment, a diesel particulate filter according to the present invention exhibits a CTE (25-800° C.) of $-5$ to $+5 \times 10^{-7}$/° C.; a porosity of 50% to 75% by volume; a median pore size of 10 to 25 micrometers; a modulus of rupture in the range of 300 to 600 pounds per square inch (psi), as measured by the four-point method on a cellular bar cut parallel to the direction of the channels from the honeycomb body having a cell density of 200 cells per square inch (cpsi) and 0.015 inch thick wall; and, a pressure drop of 4 to 5.5 kPa or less at an artificial carbon soot loading of up to 5 g/L at a flow rate of 26 scfm for a cell density of 200 cpsi, and a cell wall thickness of 0.015 inch in a 2" diameter×6" long sample.

The materials of the present invention can be synthesized using conventional high-temperature sintering of raw or pre-reacted materials. Firing temperatures range from 1200° C. to 1650° C. depending on composition, but are preferably from 1350° C. to 1425° C. The general method of producing the articles of the present invention includes mixing the appropriate batch materials, preferably materials having an average particle size of between 5 and 50 microns to obtain a low thermal expansion body. It has been found that very fine submicron $TiO_2$ powder leads to excessive firing shrinkage of greater than 10 percent and low porosity, but it is otherwise very useful when dense bodies are desired.

The mixed powders which include sources of the final chemical compounds such as oxides, carbonates, nitrates, fluorides, phosphoric acid, or boric acid are then blended together with organic processing aids such as plasticizers, lubricants, binders and solvent. Typical organic processing aids include methylcellulose binder, oleic acid/triethanol amine surfactant, and water as a solvent. The mixture is then shaped into a green body by extrusion or other appropriate forming methods, optionally dried, and fired to a hard porous structure. Phosphoric acid, particularly when it accounts for a sufficient portion of the total mixture to achieve a percentage of $P_2O_5$ (in the final article) in the range from 2% to 25%, can react with other constituent oxides at low temperatures, e.g., below 400° C., to provide additional strength to the part. Thus, use of phosphoric acid in these amounts permits the use of firing temperatures as low as 300° C., depending on the percentage of phosphoric acid, while still yielding structures having acceptable strength characteristics. However, it should be noted that if the firing temperature, when using amounts of phosphoric acid within this range, is below 1350° C., the CTE of the finished article may increase from less than $20 \times 10^{-7}$/° C. to less than $30 \times 10^{-7}$/° C. over the temperature range from 25° C. to 800° C. Table I shows a representative list of various mixtures containing various percentages of phosphoric acid and the corresponding CTE's and strengths resulting from firing green bodies containing those mixtures at different temperatures.

According to one specific embodiment of the invention, there is provided a diesel particulate filter for improved diesel exhaust filtration. The mixture is shaped by extrusion through a honeycomb die to form a honeycomb structure which is then plugged at a portion of the cells both at the inlet end and the outlet end, as known in the art to form a wall-flow filter. The plugging is only at the ends of the cells which is typically to a depth of about 1 to 20 mm, although this can vary. A portion of the cells at the outlet end but not corresponding to those at the inlet end are plugged, and vice versa. Therefore, each cell is plugged only at one end. The preferred arrangement is to have every other cell at a given face plugged in a checkered pattern.

To more fully illustrate the invention, the following non-limiting examples are presented.

EXAMPLES

Inorganic powder batch mixtures suitable for the formation of low CTE materials according to the present invention are shown in Table II and listed by mole percent. The sample compositions were formed by weighing out about 30-40 gram batches of the oxide source powders which were then dry mixed for about 15 minutes. Isopropyl alcohol in an amount of 0.5 to 1.0 ml was added to aid formation. The batch was then evenly loaded into a 2½×⅜×½ inch (64.2× 9.6×12.1 mm) mold, pressed to 10,000 pounds per square inch (psi) and held for approximately 5 seconds. The bar was then ejected from the mold, placed on Pt foil in a furnace, heated to 1400° C. over a period of 8 hours, and then cooled over a period of 6 hours. The bars were then machined to 2.00" (25.4 mm) in length and measured for thermal expansion in a differential dilatometer against a low expansion standard. The CTE is in units of $10^{-7}$/° C. over a temperature range of 25° C. to 800° C.

The samples formed were in the $TiO_2$—$Nb_2O_5$ and $ZrO_2$—$Nb_2O_5$ systems, and had predominant phases of $Ti_2Nb_{10}O_{29}$, $TiNb_2O_7$, and $Nb_2Zr_6O_{17}$, $ZrNb_{14}O_{37}$, respectively. CTEs were measured in the range of $-9.3$ to $+0.3 \times 10^{-7}$/° C.

Table III provides an example of a batch mixture extruded into a honeycomb structure and tested for diesel exhaust filtration. Oxide raw materials are batched at 25 mole percent $TiO_2$ and 75 mole percent $Nb_2O_5$. Organic additives comprising 4 percent by weight Methocel F240 (Dow Chemical) and 1 percent by weight sodium stearate are then added. The dry batch is then mulled in a mixer while slowly adding enough water to make the batch pliable, typically 10 to 30 percent by weight depending on raw material particle size, with 20 to 22 percent by weight being most preferred.

After mixing, the batch is loaded into an extruder, de-aired, and then extruded into spaghetti. The batch is extruded into spaghetti three times to ensure mixing and workability. The extrusion pressure can range from 500 to 5000 psi depending on the water content, particle size, binder content, and extruder size. The extruded honeycomb has a dimensions of 2" in diameter and a cell geometry of 200/16 cpsi. Next the part is partially heated in a dielectric drier to gel the methocel, and then dried at 90° C. for at least 2 days to remove residual moisture. The dried honeycomb structure is then fired to a top temperature of 1400° C. over a period of 8 hours, and then cooled over a period of 6 hours.

X-ray analysis indicates a predominant phase of $Ti_2Nb_{10}O_{29}$. The sample is further tested for thermal expansion in $10^{-7}/°$ C. (as measured using a dilatometer), strength in psi (as measured on a cellular bar cut parallel to the direction of the channels from a honeycomb body having a cell density of 200 cpsi and 0.015 thick walls), porosity in volume percent and median pore size in micrometers (as measured by mercury intrusion porosimetry), and pressure drop. The pressure drop is tested by loading a honeycomb sample with artificial soot (similar to copier toner) at a flow rate of 26 scfm, for loadings ranging up to 5 g/L, and measuring the pressure drop between the inlet end and outlet end in kPa.

Figure 6:
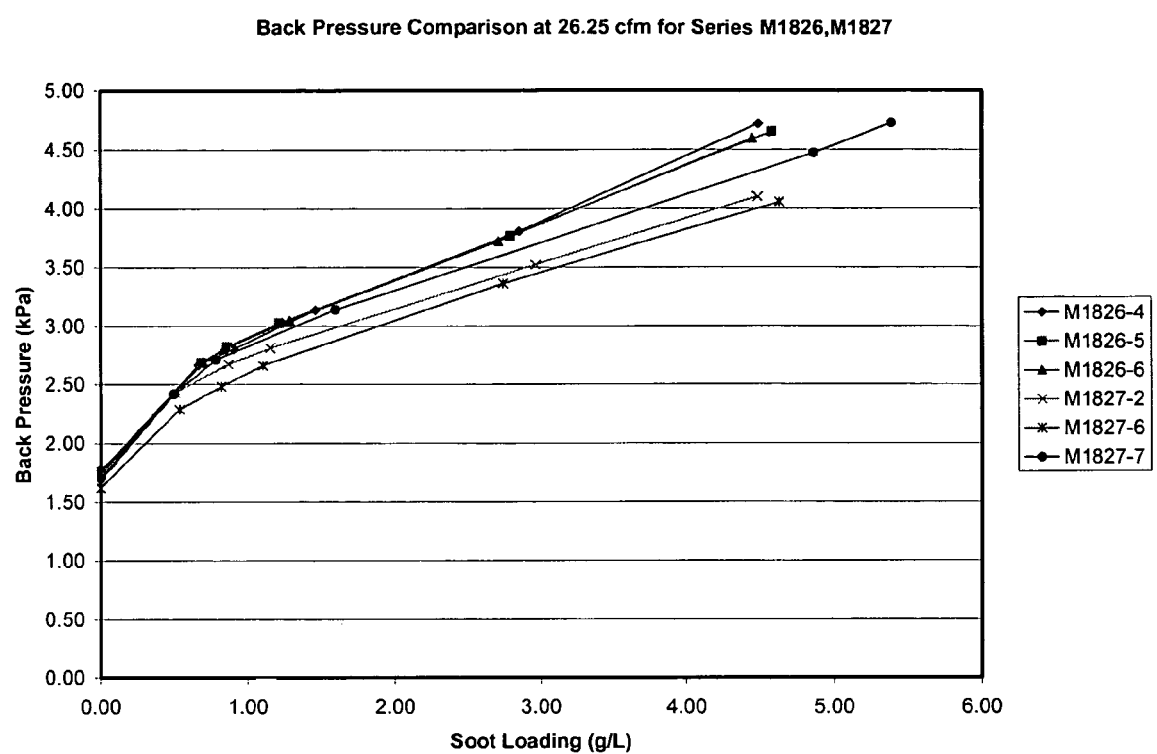

The tested sample demonstrates excellent properties for diesel exhaust filtration application which include a low CTE of $-4.1 \times 10^{-7}/°$ C.; a high porosity of 54.8 percent volume; a large median pore size of 10.3 micrometers; and, a MOR strength of 300-600 psi. The pressure drop data is provided in FIG. 6 as a function of soot loading for a plurality of samples having a predominant phase of $Ti_2Nb_{10}O_{29}$. Excellent results are shown with backpressure varying between about 1.75 kPa to about 4.75 kPa depending on soot loading.

TABLE II

| Example No. | Composition (mole percent) | | | Firing Temp. (° C.) | Major Phase | CTE ($10^{-7}/°$ C.) |
|---|---|---|---|---|---|---|
| | $Nb_2O_5$ | $TiO_2$ | $ZrO_2$ | | | |
| 1 | 75 | 25 | — | 1400 | $Ti_2Nb_{10}O_{29}$ | 0.3 |
| 2 | 50 | 50 | — | 1400 | $Ti_2NbO_7$ | -0.9 |
| 3 | 75 | — | 25 | 1400 | $ZrNb_{14}O_{37}$ | -9.3 |
| 4 | 50 | — | 50 | 1400 | $Nb_2Zr_6O_{17}$ | -3.7 |

TABLE III

| Raw Materials (mole percent) | | Extrusion Additives (wt. %) | | |
|---|---|---|---|---|
| $Nb_2O_5$ | $TiO_2$ | F240 Methocel | Sodium Stearate | Water |
| 75 | 25 | 4 | 1 | 21 |

| Firing Temp. (° C.) | Major Phase | CTE ($10^{-7}/°$ C.) | Porosity (vol. %) | MPD (μm) | Strength (psi) | Pressure Drop (kPa) |
|---|---|---|---|---|---|---|
| 1400 | $Ti_2Nb_{10}O_{29}$ | -4.1 | 54.8 | 10.3 | 300-400 | 4.8-4.9 |

What is claimed:

1. A ceramic article exhibiting a thermal expansion of $0.3 \times 10^{-7}/°$ C. or less over a temperature ranging from 25° C. to 800° C., comprising a composition having a needle-like morphology and comprising $x(A)+y(Z_2O_5)$, where x and y are mole fractions of each component such that $x+y=1$, wherein:
   a. A is $R'O_2$, wherein:
      R' is selected from the group consisting of titanium (Ti) and zirconium (Zr), and $0.15 \leq x \leq 0.80$ when R' is Ti, and $0.05 \leq x \leq 0.76$ when R' is Zr; and
   b. Z is niobium (Nb), wherein:
      $0.2 \leq y \leq 0.95$ for $Nb_2O_5$.

TABLE I

| Example | Composition (mole percent) | | | Firing Temp (° C.) | CTE $10^{-7}/°$ C. | Strength (psi) (solid bars, not cellular ware) | Major Phase | Minor Phase |
|---|---|---|---|---|---|---|---|---|
| | $Nb_2O_5$ | $P_2O_5$ (batched as Phosphoric Acid) | $TiO_2$ | | | | | |
| 1 | 75 | 1 | 24 | 500 | 27 | 181 | $Nb_2O_5$ (solid solution) | |
| | | | | 1350 | 12.5 | | $Nb_2O_5$ (solid solution) | |
| 2 | 75 | 5 | 20 | 500 | 27.8 | 1218 | $Nb_2O_5$ (solid solution) | |
| | | | | 1350 | 15.5 | | $Nb_2O_5$ (solid solution) | |
| 3 | 75 | 12.5 | 12.5 | 500 | 28 | 1453 | $Nb_2O_5$ (solid solution) | $NbPO_5$ |
| | | | | 1350 | 9.4 | | $Nb_2O_5$ (solid solution) | |
| 4 | 75 | 25 | 0 | 500 | 22.5 | 1184 | $Nb_2O_5$ (solid solution) | $Nb(P_{1.81}O_7)$ |
| | | | | 1350 | 21 | 3565 | $PNb_9O_{25}$ | $NbPO_5$ |

2. The ceramic article of claim 1 wherein for $R'O_2$, when $R'$ is Ti then $0.15 \leqq x \leqq 0.30$.

3. The ceramic article of claim 1 wherein for $R'O_2$, when $R'$ is Zr then $0.10 \leqq x \leqq 0.30$.

4. The ceramic article of claim 1 wherein $0.45 \leqq y \leqq 0.90$ for $Nb_2O_5$.

5. The ceramic article of claim 1 wherein the composition further includes an additives selected from the group consisting of alkali metal oxides and rare earth oxides.

6. The ceramic article of claim 5 wherein the alkali metal oxides are selected from the group consisting of $Li_2O$, $Na_2O$, $K_2O$, $Rb_2O$, and $Cs_2O$.

7. The ceramic article of claim 5 wherein the rare earth oxides are selected from the group consisting of $Y_2O_3$, and $La_2O_3$.

8. A method of manufacturing a ceramic article exhibiting a low thermal expansion of $0.3 \times 10^{-7}/°$ C. or less over a temperature ranging from 25° C. to 800° C., and being suitable for high temperature applications comprising:
   a. formulating a batch of raw materials selected from the group consisting of oxides, carbonates, nitrates, fluorides, phosphoric acid, and boric acid;
   b. mixing the raw material batch with processing aids selected from the group consisting of plasticizers, lubricants, and binders to form a homogenous and plasticized mixture;
   c. shaping the homogenous and plasticized mixture by extrusion to form a green body;
   d. heating the green body to a top temperature of 1200° C. to 1650° C. for a period of 1-24 hours to form a ceramic having a composition having a needle-like morphology and comprising $x(A)+y(Z_2O_5)$, where x and y are mole fractions of each component such that $x+y=1$, wherein:
      i. A is $R'O_2$, wherein
         $R'$ is selected from the group consisting of titanium (Ti) and zirconium (Zr), and $0.15 \leqq x \leqq 0.80$ when R is Ti, and $0.05 \leqq x \leqq 0.76$ when R is Zr; and
      ii. Z is niobium (Nb), wherein:
         $0.2 \leqq y \leqq 0.95$ for $Nb_2O_5$.

9. A method of manufacturing a ceramic article exhibiting a low thermal expansion $0.3 \times 10^{-7}/°$ C. or less over a temperature ranging from 25° C. to 800° C., and being suitable for high temperature applications comprising:
   a. formulating a batch of raw materials including phosphoric acid and one or more selected from the group consisting of oxides, carbonates, nitrates, fluorides and boric acid;
   b. mixing the raw material batch with processing aids selected from the group consisting of plasticizers, lubricants, and binders to form a homogenous and plasticized mixture;
   c. shaping the homogenous and plasticized mixture by extrusion to form a green body;
   d. heating the green body to a top temperature of 300° C. to 1450° C. for a period of 1-24 hours to form a ceramic having a composition having a needle-like morphology and comprising $x(A)+y(Z_2O_5)$, where x and y are mole fractions of each component such that $x+y=1$, wherein:
      i. A is $R'O_2$, wherein:
         1. for $R'O_2$, $R'$ is selected from the group consisting of titanium (Ti) and zirconium (Zr), and $0.15 \leqq x \leqq 0.80$ when R is Ti, and $0.05 \leqq x \leqq 0.76$ when R is Zr;
      ii. Z is niobium (Nb), wherein:
         $0.2 \leqq y \leqq 0.95$ for $Nb_2O_5$.

10. The method of claim 9 wherein the green body is heated to a temperature of 300° C. to 600° C. for a period of 1-24 hours.

11. A ceramic article exhibiting a thermal expansion of $0.3 \times 10^{-7}/°$ C. or less over a temperature ranging from 25° C. to 800° C., having a composition comprising $x(A)+y(Z_2O_5)$, where x and y are mole fractions of each component such that $x+y=1$, wherein:
   a. A is $R'O_2$, wherein:
      $R'$ is selected from the group consisting of titanium (Ti) and zirconium (Zr), and $0.15 \leqq x \leqq 0.80$ when $R'$ is Ti, and $0.05 \leqq x \leqq 0.76$ when $R'$ is Zr;
   b. Z is niobium (Nb), wherein:
      $0.2 \leqq y \leqq 0.95$ for $Nb_2O_5$; and
wherein the composition further includes an additive selected from the group consisting of alkali metal oxides and rare earth oxides.

12. The ceramic article of claim 11, wherein for $R'O_2$, when $R'$ is Ti then $0.15 \leqq x \leqq 0.30$.

13. The ceramic article of claim 11, wherein for $R'O_2$, when $R'$ is Zr then $0.10 \leqq x \leqq 0.30$.

14. The ceramic article of claim 1 wherein $0.45 \leqq y \leqq 0.90$ for $Nb_2O_5$.

15. The ceramic article of claim 5 wherein the alkali metal oxides are selected from the group consisting of $Li_2O$, $Na_2O$, $K_2O$, $Rb_2O$, and $Cs_2O$.

16. The ceramic article of claim 5 wherein the rare earth oxides are selected from the group consisting of $Y_2O_3$, and $La_2O_3$.

17. A method of manufacturing a ceramic article exhibiting a low thermal expansion $0.3 \times 10^{-7}/°$ C. or less over a temperature ranging from 25° C. to 800° C., and being suitable for high temperature applications comprising:
   a. formulating a batch of raw materials including phosphoric acid and one or more selected from the group consisting of oxides, carbonates, nitrates, fluorides and boric acid;
   b. mixing the raw material batch with processing aids selected from the group consisting of plasticizers, lubricants, and binders to form a homogenous and plasticized mixture;
   c. shaping the homogenous and plasticized mixture by extrusion to form a green body;
   d. heating the green body to a top temperature of 300° C. to 1650° C. for a period of 1-24 hours to form a ceramic having a composition comprising $x(A)+y(Z_2O_5)$, where x and y are mole fractions of each component such that $x+y=1$, wherein:
      i. A is $R'O_2$, wherein:
         1. for $R'O_2$, $R'$ is selected from the group consisting of titanium (Ti) and zirconium (Zr), and $0.15 \leqq x \leqq 0.80$ when R is Ti, and $0.05 \leqq x \leqq 0.76$ when R is Zr;
      ii. Z is niobium (Nb), wherein:
         $0.2 \leqq y \leqq 0.95$ for $Nb_2O_5$;
wherein the composition further includes an additive selected from the group consisting of alkali metal oxides and rare earth oxides.

18. The method of claim 17 wherein the green body is heated to a temperature of 300° C. to 600° C. for a period of 1-24 hours.

* * * * *

UNITED STATES PATENT AND TRADEMARK OFFICE
CERTIFICATE OF CORRECTION

PATENT NO. : 7,341,970 B2
APPLICATION NO. : 11/092001
DATED : March 11, 2008
INVENTOR(S) : Douglas Munroe Beall et al.

It is certified that error appears in the above-identified patent and that said Letters Patent is hereby corrected as shown below:

| Col. | Line | | |
|------|------|---|---|
| 9 | 8 | should read as following | "further includes an additive selected from the group con-" |

Signed and Sealed this

Sixteenth Day of December, 2008

JON W. DUDAS
*Director of the United States Patent and Trademark Office*